United States Patent [19]
Bugelski et al.

[11] 3,929,645
[45] Dec. 30, 1975

[54] FILTERING AND MIXING APPARATUS

[75] Inventors: William G. Bugelski; Robert E. Teasley, Jr., both of Columbus, Ind.

[73] Assignee: Cummins Engine Company, Inc., Columbus, Ind.

[22] Filed: May 24, 1974

[21] Appl. No.: 472,936

[52] U.S. Cl. ............... 210/251; 184/1.5; 210/257; 210/258; 210/260
[51] Int. Cl.² ........................................ B01D 29/00
[58] Field of Search ........ 184/1.5; 210/70, 181, 186, 210/251–260, 416, 418, 428, 437

[56] References Cited
UNITED STATES PATENTS

| | | | |
|---|---|---|---|
| 2,010,435 | 8/1935 | Matheson | 210/260 X |
| 2,230,174 | 1/1941 | Beale | 210/181 X |
| 3,489,245 | 1/1970 | Broadwell | 184/1.5 |

FOREIGN PATENTS OR APPLICATIONS 486,175  5/1938  United Kingdom........... 184/1.5

*Primary Examiner*—Charles N. Hart
*Assistant Examiner*—Richard W. Burks
*Attorney, Agent, or Firm*—Gary M. Gron; Robert T. Ruff

[57]  ABSTRACT

During servicing, used lubricating oil is pumped from the sump of a compression ignition engine crankcase and mixed with fuel oil from a supply tank for the engine in a ratio of approximately three parts fuel oil to one part used lubricating oil. This mixture is passed through a filter and discharged into the supply tank at a concentration not exceeding 5% lubricating oil so that the filtered used lubricating oil is effectively mixed for burning with the fuel in the engine.

15 Claims, 1 Drawing Figure

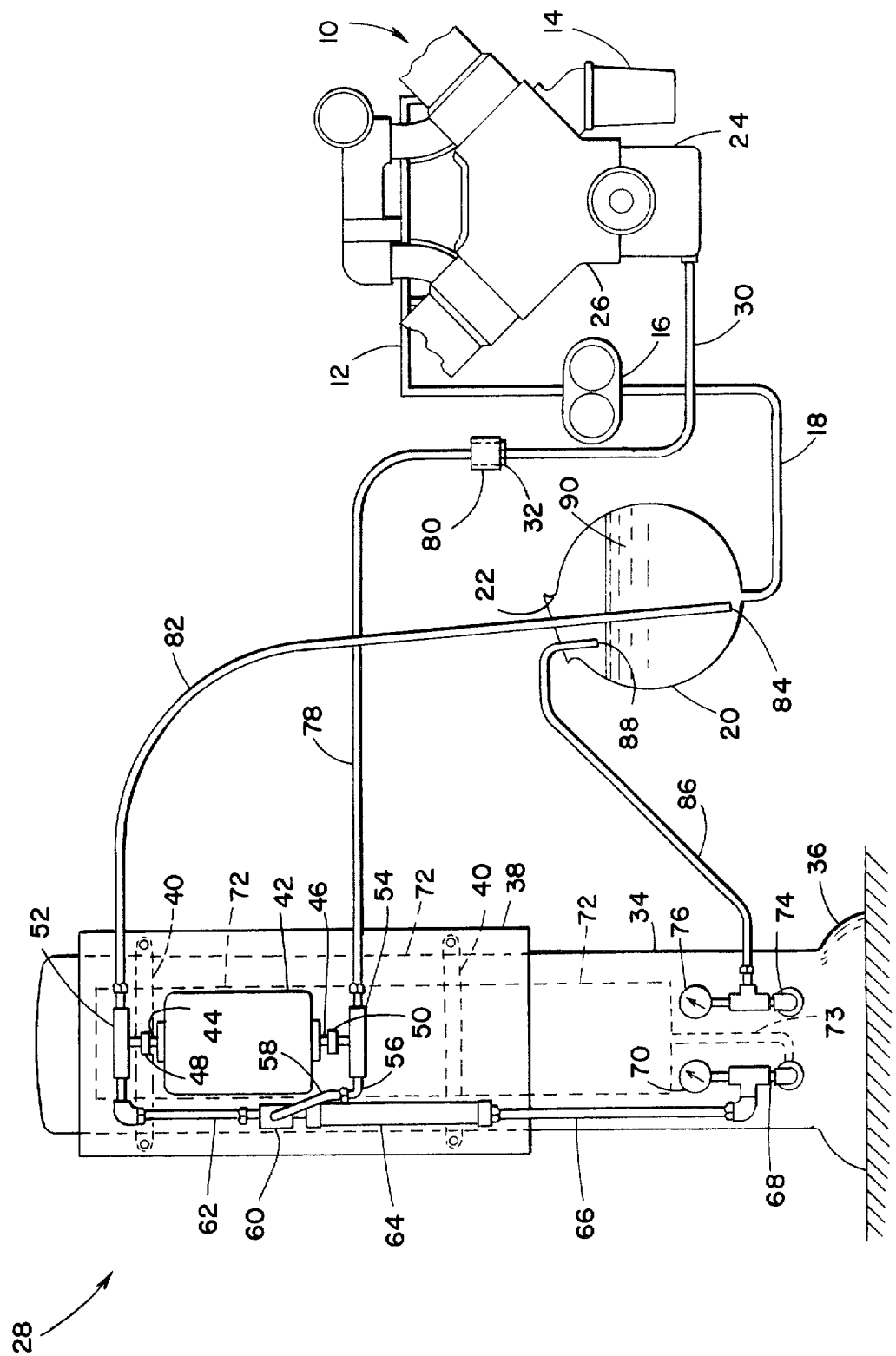

FILTERING AND MIXING APPARATUS

Most internal combustion engines have a system for lubricating their rotating and moving components. In time, the oil used in these systems becomes contaminated with metal particles, dirt, coolant, and sludge. Because of this, it is necessary to change oil at periodic intervals. When oil is changed, the used oil must be disposed of. Recently, local ordnances have severely limited the techniques for disposal of waste oil.

In most cases, the disposal of this used lubricating oil is a significant expense. Until the recent fuel shortages, vehicle service centers would have to pay to have the used oil taken away. At present, used oil is removed at no cost or for a slight payment per gallon. However, this method of disposing of the oil still requires an investment in storage tanks for accumulation prior to removal.

In certain installations, the disposal of used oil is prohibitively expensive. On offshore drilling rigs and certain islands, the used oil must be transported by sea back to a mainland disposal site. The cost of shipping the oil makes disposal a significant proportion of the operating costs.

To solve these problems, it has been proposed to filter the used oil after draining and add it to the fuel oil that will be burned by a compression ignition engine. This is possible because the fuel oil and the lubricating oil have the same general characteristics. However, prior approaches have been marginally effective in completely mixing the lubricating oil with the fuel oil and removing oil contaminates.

These problems are solved in accordance with the present invention by a system in which used lubricating oil is extracted from the sump of a compression ignition engine, blended with fuel oil and then filtered before it is added to a tank of fuel oil that will be consumed by the engine.

The above and other related features of the present invention will be apparent from a reading of the following description of the disclosure shown in the accompanying drawing and novelty thereof pointed out in the appended claims.

The single FIGURE shows, schematically, a compression ignition engine and a fuel supply with apparatus embodying the present invention for extracting used lubricating oil from the engine and adding it to the fuel supply tank.

The drawing shows a compression ignition engine 10 that burns fuel oil from a system supply line 12. The operating principles of the compression ignition engine and the manner in which fuel oil is metered to the individual cylinders is so well known by those skilled in the art that details of these components will not be discussed to simplify the description. The fuel supply line 12 receives pressurized fuel from an engine driven pump 16. A fuel line 18 extends to a fuel storage tank 20 having a filler opening 22. If engine 10 is used to power a vehicle, the fuel tank would be mounted at some point on the vehicle. If engine 10 is used in a stationary installation, both the fuel tank and engine would be permanently mounted, although not necessarily on the same base.

Engine 10 has a lubricating system in which oil is pressurized by a pump (not shown) for deliverance through a filter 14 to suitable passages for lubricating the rotating parts in the engine. The oil then is returned to a sump 24 secured to the bottom of the engine crankcase 26.

In accordance with the present invention, the system designated by numeral 28 removes used lubricating oil from the engine sump 24 and then adds it to the fuel tank 20 to be burned with fuel oil by engine 10. To utilize this system, engine sump 24 preferably is fitted with a flexible hose or conduit 30 extending from a low point in the sump 24 to a quick disconnect fitting 32 located at a point permitting ready access. In many cases, it would be possible to connect the flexible hose 30 to the sump 24 at the fitting that receives the usual drain plug.

The system 28 comprises a filter housing 34 in the form of an upright cylindrical chamber having a base 36. Many filter housings may be used for this purpose. One filter housing giving acceptable performance is the one incorporated in filter assembly model No. 3036 manufactured by Lubrifiner Corporation, Los Angeles, California.

A mounting plate 38 is secured to filter housing 34 by suitable straps 40. Plate 38 provides a base for mounting an electric motor 42. Motor 42 has a common shaft having an upper end 44 and a lower end 46. Couplings 48 and 50 respectively couple the shaft ends 44 and 46 to pumps 52 and 54. Pumps 52 and 54 may be any suitable type of pump capable of pumping fuel oil or lubricating oil such as centrifugal type. An alternative, gear pumps may be employed to increase the capability of pumping lubricating oil from the engine sump 24. As discussed below, the flow output of pump 52 is greater than that for pump 54. The variation in output may be achieved by using pumps of different capacity or as shown by using pumps of identical capacity and using a fitting 56 on the outlet of pump 54 that acts as an orifice thus reducing its flow.

A flexible hose 58 extends from the outlet of pump 52 to a T-fitting 60. A flexible hose 62 extends from pump 52 also to the T-fitting 60. The output from pumps 52 and 54 merge in the T-fitting 60 which connects with an elongated mixer 64. Mixer 64 is in tubular form with spiral auger flights on its interior walls to promote effective mixing of the oil and fuel. Many mixers are commercially available. A mixer suitable for this purpose is model No. 322-5 mixer available from the Kenics Corporation, 1 Southside Drive, Danvers, Massachusetts.

A flexible conduit 66 extends from the downstream end of mixer 64 to an inlet fitting 68 for the filter housing 34. A pressure gage 70 indicates the pressure in the line at the inlet to filter housing 34. Filter housing 34 contains a number of stacked filter elements 72. Preferably, there are three such elements. Filters giving excellent results are LF-750 filter elements manufactured by the Fleetguard Division of Cummins Engine Company, Inc. Housing 34 has an internal passage 73 leading from inlet fitting 68 to the central section of filters 72. The blend of oil and fuel passing outward through the filters 72 in a parallel flow relationship. The filtered blend is discharged from housing 34 at an outlet fitting 74 having a pressure gage 76 indicating pressure in the line at that point.

To interconnect the system 28 with the engine 10, a flexible conduit 78 extends from the inlet of pump 54 to a quick disconnect fitting 80 releasably connected to fitting 32. A second flexible conduit 82 extends from the inlet of pump 52 and has its open end 84 inserted in the bottom of the tank 20. A third flexible conduit 86 extends from outlet fitting 74 and has its open end 88 positioned above the upper level of fuel 90 in tank 20.

The system is put into operation when engine 10 is shut down for servicing. Servicing of engine 10 at the specified interval includes the changing of oil in sump 24 and changing of filter 14 along with other items. If engine 10 powers a vehicle, the vehicle is brought into a service area, where system 28 is located, and the engine 10 shut down.

Hose 78 is connected to hose 30 and hoses 82, 86 placed in tank 20. Motor 42 is turned on to drive pumps 54 and 52. Pump 54 pumps used lubricating oil from sump chamber 24 and into the mixer 64. At the same time, pump 52 pumps fuel oil 90 from tank 20 into the mixer 64.

The output of the pumps is selected so that pump 52 has an output preferably three times greater than the output of pump 54. The ratio of three parts fuel oil to one part lubricating oil is determined for conditions in which the lubricating oil is at approximately its operating temperature; i.e., just after the engine 10 has been shut down. If the engine has set for awhile, or in cold weather, the viscosity of the oil would increase greatly thereby reducing the relative output of pump 54. However, since the system is essentially a closed system in which fuel oil recirculates, the reduced output of pump 54 has no effect on the ultimate concentration of lubricating oil in fuel oil.

The mixing produces a blend of fuel oil and lubricating oil which is then passed through the three elements in the filter housing for removing metal particulates, sludge, coolant or other impurities. The flow from filter housing 34 passes through hose 86 to the fuel tank 20.

The preblending of the fuel oil with used lubricating oil makes the filtering and mixing process extremely efficient. The fuel oil decreases the viscosity of the oil and thus permits easier flowing through the filter. Furthermore, the premixing in the system 28 and particularly in mixer 64 insures a very uniform mixture of oil and fuel in tank 20. In prior art systems used oil that is simply filtered could drop to the bottom of the tank because of its higher density and produce an abnormally high concentration of oil. In cold weather, this could cause problems in the fuel lines. In the present system, however, the premixing lowers the density and viscosity of the oil to further enhance its dispersion and mixing in the tank 20.

The system 28 continues to operate until all the lubricating oil is pumped from sump 24. The time for this operation may be selected to coincide at the time required for other service functions normally performed when the oil in the engine 10 is being changed. For example, the flow capacity of the system may be selected to produce an operating time coinciding with the time it takes to remove the oil filter 14 from the engine.

In past systems for adding lubricating oil to fuel oil, little attention has been given to the possible effect on engine emission levels. It has been found that a concentration of lubricating oil no greater than 5% by volume has no adverse effect on emission levels. The ratio for a particular engine and tank is determined by the amount of fuel 90 in tank 20 and the amount of lubricating oil in sump 24. A typical diesel engine has a sump capacity of between 5 and 7 gallons. For highway trucks, tanks usually have a capacity of between 150 to 250 gallons. If tank 20 is filled prior to the oil change, the addition of the 7 gallons lubricating oil to a full tank of 250 gallons would produce a concentration approximately 3% which is well below the 5% allowable. Even if the tank has a capacity of 150 gallons, the concentration is 4.5%. This is feasible since vehicles are normally fueled either before or just after they are serviced. As pointed out above, the premixing of fuel and oil effectively prevents any local concentration in the tank that would exceed the 5% level.

The above system is highly effective in utilizing used lubricating oil as an additive in fuel oil to dispose of it. The system efficiently removed the larger particulate matter commonly found in used lubricating oil. The illustrated system uses the filter housing as a support for the pumps, motor and mixer. This makes it particularly suitable for in situ removal of engine oil. It should be apparent to those skilled in the art that the system may have a different physical arrangement and still fall within the spirit and scope of the present invention.

Having thus described the invention, what is claimed as novel and desired to be secured by Letters Patent of the United States is:

1. A system for addition of used lubricating oil to fuel oil burned by a compression ignition engine, said system comprising:
   means for extracting used lubricating oil from said compression ignition engine;
   means for mixing fuel oil with said extracted lubricating oil and discharging the mixture of fuel oil and used lubricating oil from a common outlet;
   a filter having an inlet connected to the outlet of said mixing means for filtering contaminates from said mixture; and,
   means for adding said mixture to a tank of fuel oil for use by said compression ignition engine.

2. A system as in claim 1 wherein said mixing means mixes a greater proportion of fuel oil than used lubricating oil.

3. A system as in claim 2 wherein the ratio of fuel oil to used lubricating oil is approximately 3 to 1.

4. A system as in claim 1 wherein said extracting and mixing means comprises:
   a first pump having an inlet for receiving used lubricating oil and an outlet;
   a second pump having an inlet for connection to a source of fuel oil and an outlet; and,
   means receiving the output of said first and second pump for mixing said lubricating and fuel oil for discharge from said common outlet.

5. A system as in claim 4 further comprising a motor having a common double ended output shaft, the ends of said output shaft being connected to and driving said pumps.

6. A system as in claim 5 wherein said pumps have a predetermined flow output ratio so that a greater proportion of fuel oil passes into said mixing means than said lubricating oil.

7. A system as in claim 6 wherein said pumps have substantially equal capacities and said first pump has a restricting orifice in series flow connection thereby reducing the relative flow output of the said first pump.

8. A system as in claim 1 for in situ addition of used lubricating oil from the sump of a compression ignition engine to the fuel oil in a fuel oil tank for use by said compression ignition engine, said system further comprising:
   an elongated flexible conduit connected to said extracting means and being releasably connected to sump section of said compression ignition engine;

a second elongated flexible conduit connected to said mixing means and insertable in said fuel oil tank; and, a third elongated flexible conduit connected to the outlet of said filter thereby forming said mixture adding means.

9. A system as in claim 1 wherein said lubricating oil is added to said fuel oil in a concentration of up to approximately 5% by volume.

10. A system as in claim 1 wherein said filter includes a plurality of filter elements in parallel flow relationship.

11. A system as in claim 1 wherein:
said filter comprises an upright cylindrical outer housing; and,
the common outlet of said mixing means is connected to the inlet of said filter.

12. A system as in claim 11 wherein said extracting and mixing means comprises
a first pump having an inlet receiving used lubricating oil and an outlet, a second pump having an outlet and a mixing means receiving the output of said pumps and connected to said filter inlet;
said system further comprises an electric motor mounted on said filter housing and having common double ended output shaft driving said first and second pumps.

13. A system as in claim 12 wherein said mixing means comprises an elongated tube receiving the output of said first and second pumps and connected to said filter inlet, said tube having spiral auger flights on its interior walls for promoting mixing of said fuel oil and lubricating oil in said tube.

14. A system as in claim 13 further comprising pressure gages connected to the inlet and outlet of said filter for indicating the pressure drop thereacross.

15. A system as in claim 12 for addition of used lubricating oil from the sump of a compression ignition engine to a fuel oil tank supplying fuel oil to said engine wherein said system further comprises:
a first flexible hose extending from the inlet of said first pump and being releasably connected to the sump portion of said crankcase;
a second flexible hose extending from the inlet to said second pump and insertable in said fuel oil tank; and,
a third flexible hose extending from the outlet of said filter to said fuel oil tank.

* * * * *